United States Patent
Hwang et al.

(10) Patent No.: US 7,777,833 B2
(45) Date of Patent: Aug. 17, 2010

(54) DOUBLE-SIDE ILLUMINATION APPARATUS FOR DISPLAY DEVICE AND DUAL DISPLAY DEVICE EMPLOYING THE SAME

(75) Inventors: Seong-mo Hwang, Seongnam-si (KR); Dong-ho Wee, Seongnam-si (KR); Seung-ho Nam, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 11/844,754

(22) Filed: Aug. 24, 2007

(65) Prior Publication Data

US 2008/0101087 A1      May 1, 2008

(30) Foreign Application Priority Data

Oct. 26, 2006    (KR) .................. 10-2006-0104694

(51) Int. Cl.
G02F 1/1335      (2006.01)
(52) U.S. Cl. .................. 349/65; 349/61; 349/62; 349/63; 349/64; 362/615; 362/616; 362/617; 362/618; 362/620
(58) Field of Classification Search ............. 349/61–65; 362/615–620
See application file for complete search history.

(56) References Cited

U.S. PATENT DOCUMENTS

| | | | |
|---|---|---|---|
| 5,587,816 A | * | 12/1996 | Gunjima et al. ............... 349/62 |
| 7,248,308 B2 | * | 7/2007 | Mizutani et al. .............. 349/67 |
| 7,290,918 B2 | * | 11/2007 | Han et al. .................... 362/616 |
| 7,380,953 B2 | * | 6/2008 | Onishi et al. .................. 362/29 |
| 7,667,788 B2 | * | 2/2010 | Lee et al. ...................... 349/65 |
| 2003/0058383 A1 | | 3/2003 | Jagt et al. |

FOREIGN PATENT DOCUMENTS

CN      1558999 A      12/2004

OTHER PUBLICATIONS

Cornelissen, Hugo J. et al., "38.3: Polarized Light LCD Backlight Based on Liquid Crystalline Polymer Film: a New Manufacturing Process", SID 04 Digest, p. 1178-1181. May 25, 2004.
Office Action of Mar. 8, 2010, of the Chinese Patent Office for No. 200710167915.1.

* cited by examiner

*Primary Examiner*—Julie-Huyen L Ngo
(74) *Attorney, Agent, or Firm*—Sughrue Mion, PLLC

(57) ABSTRACT

A double-side illumination apparatus includes a light source, an isotropic light guide plate including an incident plane on which light emitted from the light source is incident, an opposite plane facing the incident plane, and upper and lower surfaces through which the light is out-coupled. Isotropic micro-structures are formed on the upper and lower surfaces of the isotropic light guide plate, respectively, and first and second anisotropic layers are respectively formed on the upper and lower surfaces of the isotropic light guide plate so as to completely cover the isotropic micro-structures. Herein, the first and second anisotropic layers have different refractive indices with respect to light having first and second polarization components that are perpendicular to each other.

20 Claims, 6 Drawing Sheets

DOUBLE-SIDE ILLUMINATION APPARATUS FOR DISPLAY DEVICE AND DUAL DISPLAY DEVICE EMPLOYING THE SAME

CROSS-REFERENCE TO RELATED PATENT APPLICATIONS

This application claims priority from Korean Patent Application No. 10-2006-0104694, filed on Oct. 26, 2006, in the Korean Intellectual Property Office, the disclosure of which is incorporated herein in its entirety by reference.

BACKGROUND OF THE INVENTION

1. Field of the Invention

The present invention relates to a double-side illumination apparatus for a display device and a dual display device employing the same and, more particularly, to a double-side illumination apparatus which can provide light having a specific polarization component through upper and lower surfaces, respectively, and a dual display device employing the same.

2. Description of the Related Art

In recent years, with the rapid spread of folder type mobile phones having a dual display, the need for effectively supplying light to two liquid crystal display panels has increased. In the dual display, two illumination apparatuses are used for providing light to the two liquid crystal display panels, respectively. However, this leads to increased power consumption and a limitation on how thin the liquid display panel can be. Accordingly, a technology for a double-side illumination apparatus is being developed, in which light can be simultaneously provided to two liquid crystal panels using one illumination apparatus.

Figure 1:
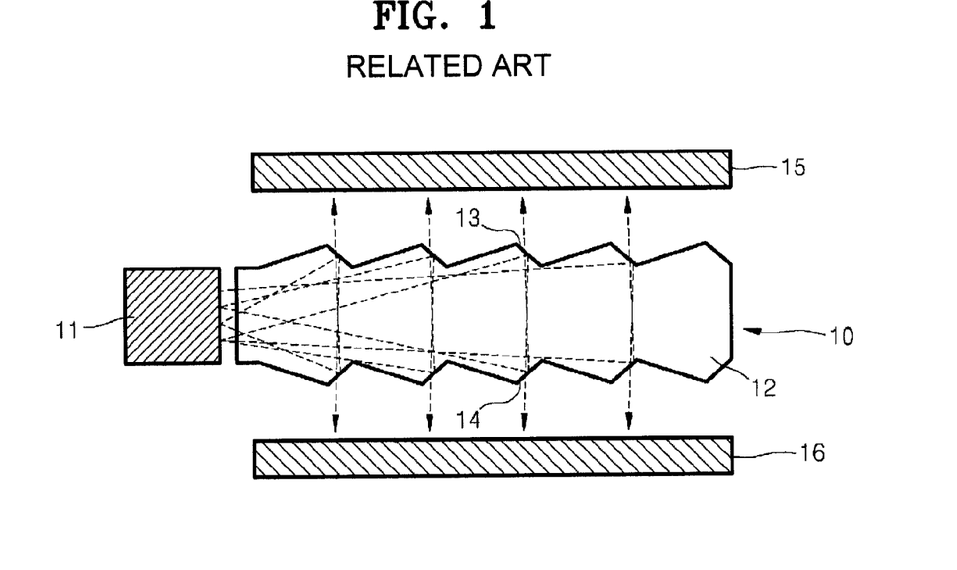
FIG. 1 is a sectional view illustrating an example of a related art double-side illumination apparatus and a dual display device employing the same.

FIG. 1 is a sectional view illustrating an example of a related art double-side illumination apparatus 10 and a dual display device employing the same. In the double-side illumination apparatus 10 of FIG. 1, a light emitted from a light source 11 is incident into a light guide plate 12 through one side of the light guide plate 12. Prism patterns 13 and 14 are formed on both side surfaces of the light guide plate 12. Therefore, a portion of light propagating inside the light guide plate 12 is totally reflected by the lower prism pattern 14 and out-coupled toward an upper surface of the light guide plate 12. Another portion of light propagating inside the light guide plate 12 is totally reflected by the upper prism pattern 13 and out-coupled toward the lower surface of the light guide plate 12. As illustrated in FIG. 1, upper and lower liquid crystal display panels 15 and 16 are disposed above and below the light guide plate 12, respectively. Accordingly, the light out-coupled through the upper surface of the light guide plate 12 is incident on the upper liquid crystal display panel 15, and the light out-coupled through the lower surface of the light guide plate 12 is incident on the lower liquid crystal display panel 16.

Since the light out-coupled through the upper and lower surfaces of the light guide plate 12 in the double-side illumination apparatus 10 of FIG. 1 is unpolarized light, 50% of the light is absorbed by absorption polarizers included in the upper and lower liquid crystal display panels 15 and 16. As a result, optical efficiency of the double-side illumination apparatus 10 is degraded.

Figure 2:
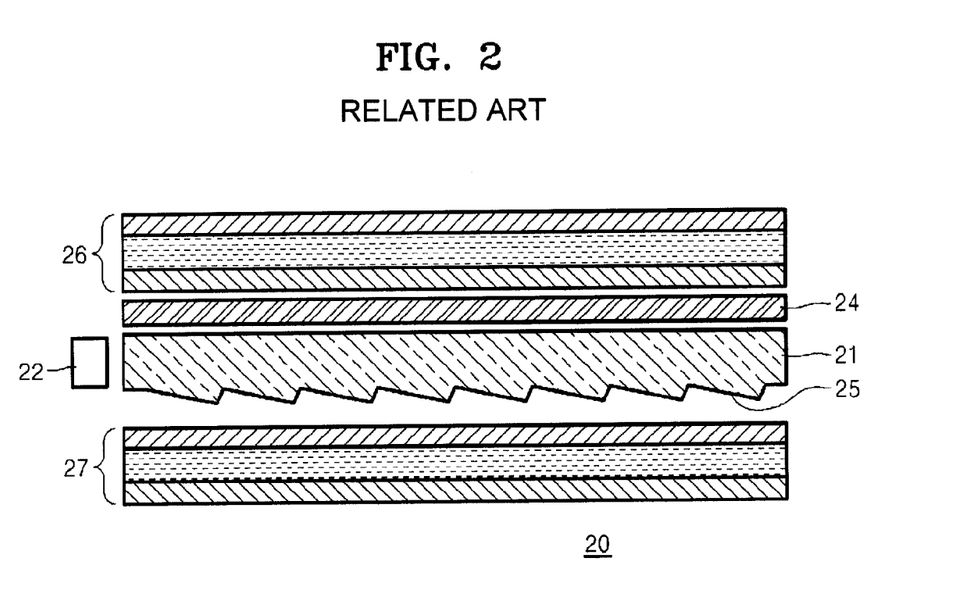
FIG. 2 is a sectional view illustrating another example of a related art double-side illumination apparatus and a dual display device employing the same.

FIG. 2 is a sectional view illustrating another example of a related art double-side illumination apparatus 20 and a dual display device employing the same. The double-side illumination apparatus 20 of FIG. 2 includes a light guide plate 21 having a prism pattern 25 only on a lower surface thereof for totally reflecting incident light, a light source 22 disposed at one side of the light guide plate 21, and a reflective polarizer 24 disposed above the light guide plate 21. In such a configuration, the light emitted from the light source 22 is incident on a side surface of the light guide plate 21 and propagates inside the light guide plate 21. The light propagating inside the light guide plate 21 is totally reflected by the prism pattern 25 on the lower surface of the light guide plate 21 and then out-coupled toward the upper surface of the light guide plate 21. Among the light out-coupled toward the top surface of the light guide plate 21, light with the first polarization component is transmitted through the reflective polarizer 24, whereas light with the second polarization component, which is orthogonal to the first polarization, is reflected toward the light guide plate 21. Accordingly, a portion of the light is incident on an upper liquid crystal panel 26 disposed above the reflective polarizer 24, and another portion is incident on a lower liquid crystal display panel 27 disposed below the light guide plate 21.

In the double-side illumination apparatus 20 of FIG. 2, the light incident on the upper liquid crystal display panel 26 has only a specific polarization component so that loss does not occur. However, because the light incident on the lower liquid crystal display panel 27 is re-transmitted through the light guide plate 21, reflection loss occurs and further the polarization is not preserved while the light passes through the light guide plate 21. Therefore, the amount of light incident on the lower liquid crystal display panel 27 is reduced due to the reflection loss, and a portion of the light may be absorbed by the absorption polarizer included in the lower liquid crystal display panel 27 as well. As a result, brightness is more degraded in the lower liquid crystal display panel 27 than in the upper liquid crystal display panel 26. Moreover, because the reflective polarizer 24, which is used for operation in a wide-angle range, is expensive, the total price of the dual display device is increased.

SUMMARY OF THE INVENTION

The present invention has been made in view of the above mentioned problems. Illustrative, non-limiting exemplary embodiments of the present invention described herein overcome the above disadvantages, as well as achieving other advantages.

An apparatus consistent with the present invention includes a double-side illumination apparatus providing light with a uniform polarization state to two display devices disposed on both sides of a light guide plate, respectively.

The present invention also provides a dual display device employing the double-side illumination apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 3:
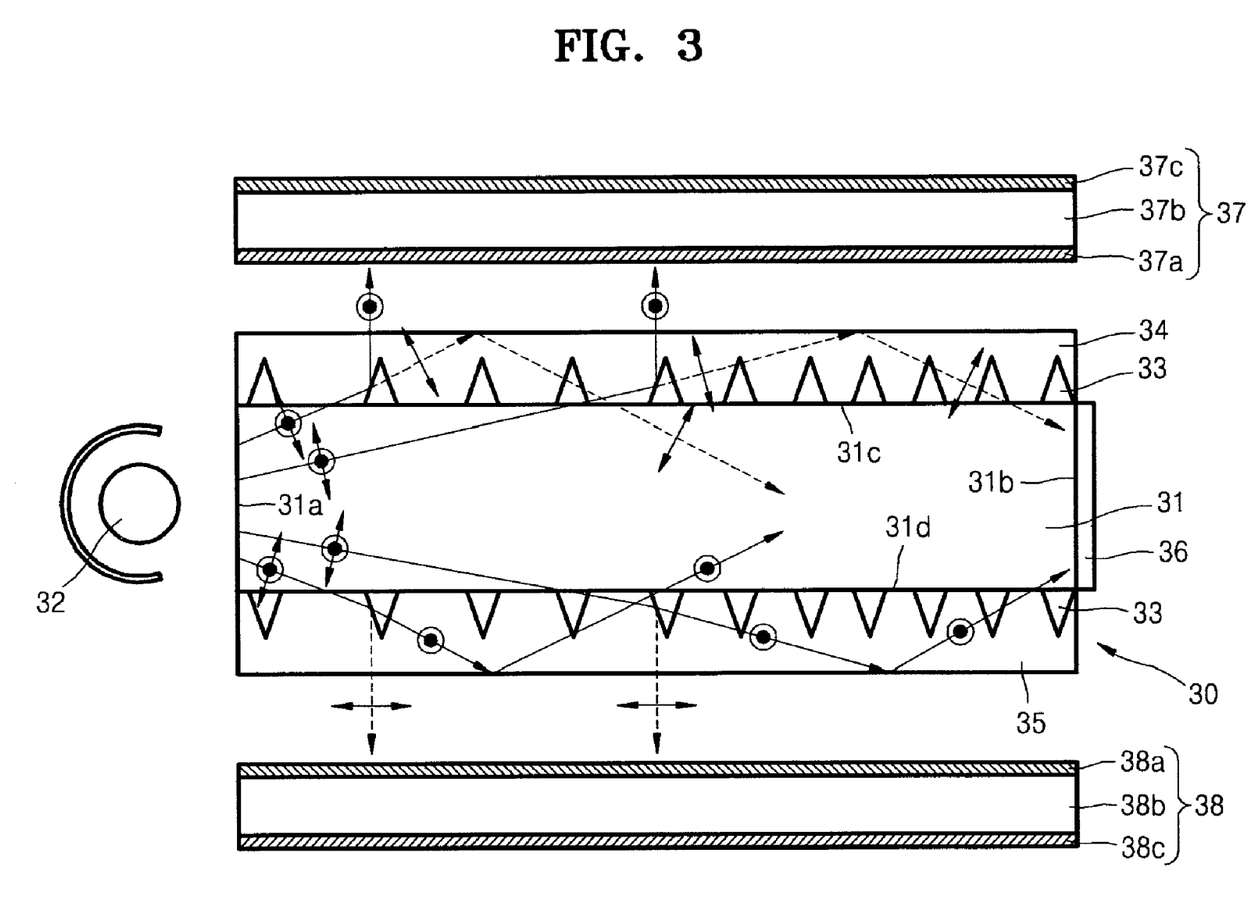
FIG. 3 is a sectional view illustrating structures of a double-side illumination apparatus and a dual display device employing the same according to an embodiment of the present invention.

FIG. 3 is a sectional view illustrating structures of a double-side illumination apparatus 30 and a dual display device employing the same according to an exemplary embodiment of the present invention. Referring to FIG. 3, the dual display device includes the double-side illumination apparatus 30 which provides light having two kinds of polarization components that are perpendicular to each other through an upper surface and a lower surface thereof, respectively, a first display device 37 disposed opposite to the upper surface of the double-side illumination apparatus 30, and a second display device 38 disposed opposite to the lower surface of the double-side illumination apparatus 30. Herein, the first and second display devices 37 and 38 may be liquid crystal display devices. In this case, the first display device 37 includes a liquid crystal layer 37b, and a rear-side polarizer 37a and a front-side polarizer 37c disposed on both surfaces of the liquid crystal layer 37b. Likewise, the second display device 38 includes a liquid crystal layer 38b, and a rear-side polarizer 38a and a front-side polarizer 38c disposed on both surfaces of the liquid crystal layer 38b.

Meanwhile, referring to FIG. 3, the double-side illumination apparatus 30 according to the current embodiment of the present invention includes a light source 32, an isotropic light guide plate 31, isotropic micro-structures 33, and first and second anisotropic layers 34 and 35. Herein, the isotropic light guide plate 31 has an incident plane 31a which the light emitted from the light source 32 is incident on, an opposite plane 31b facing the incident plane 31a, and upper and lower surfaces 31c and 31d through which light is out-coupled. The isotropic micro-structures 33 are formed on the upper and lower surfaces 31c and 31d of the isotropic light guide plate 31, respectively. The first and second anisotropic layers 34 and 35 are respectively formed on the upper and lower surfaces 31c and 31d of the isotropic light guide plate 31 such that they cover the microstructures 33 completely. A reflection plate 36 is additionally disposed on the opposite plane 31b of the light guide plate 31 for reflecting the remaining light not out-coupled through the upper and lower surfaces 31c and 31d toward the inside of the light guide plate 31.

The light source 32 may comprise a point light source such as a light emitting diode (LED), a laser diode (LD) or the like, or a line light source such as a cold cathode fluorescent lamp (CCFL) or the like.

The isotropic light guide plate 31 is formed of an optical isotropic material having a constant refractive index with respect to all light regardless of polarization direction. The light source 32 is disposed opposite to the incident plane 31a of the isotropic light guide plate 31. The light emitted from the light source 32 enters the isotropic light guide plate 31 by being incident on the incident plane 31a. The light propagates toward the opposite plane 31b of the light guide plate 31 in the isotropic light guide plate 31. Therefore, the isotropic light guide plate 31 may be formed of a material with excellent light transmittance such as polymethly methacrylate (PMMA), polycarbonate (PC) or the like.

The isotropic micro-structures 33 respectively formed on the upper and lower surfaces 31c and 31d of the isotropic light guide plate 31 have fine inclined surfaces for dividing the light into two kinds of light of which polarization directions are perpendicular to each other and vertically out-coupling the two kinds of light toward the upper and lower surfaces 31c and 31d of the isotropic light guide plate 31, respectively. The isotropic micro-structures 33 may include an isotropic material having a refractive index substantially equal to that of the isotropic light guide plate 31. For instance, it is also possible to integrally form the isotropic light guide plate 31 and the isotropic micro-structures 33 through an injection molding process. Meanwhile, the isotropic micro-structures 33 may be configured with an array of a plurality of microprisms having various shapes as illustrated in FIGS. 4A through 4D, according to exemplary embodiments of the present invention. The space between neighbouring microprisms may become progressively smaller from the incident plane 31a toward the opposite plane 31b for preventing a decrease of illuminance progressively farther away from the light source 32 or uniformly out-coupling the light throughout the whole light guide plate 31.

The first and second anisotropic layers 34 and 35 respectively formed on the upper and lower surfaces 31c and 31d of the isotropic light guide plate 31 may be formed of a material having different refractive indices with respect to the light having one polarization component and the light having the other polarization component, wherein one polarization component is perpendicular to the other polarization component. For example, the first anisotropic layer 34 formed on the upper surface 31c of the isotropic light guide plate 31 may be formed of a material of which a refractive index ne1 with respect to extraordinary rays is greater than a refractive index no1 with respect to ordinary rays. The refractive index no1 of the first anisotropic layer 34 with respect to the ordinary rays may be substantially equal to a refractive index ni of the isotropic micro-structures 33. Accordingly, the relationship between the refractive indices ne1, no1 and ni may satisfy the following condition, i,e., ni=no1<ne1. Here, the description that the refractive indices no1 and ni are equal to each other does not means that specific numerical values of no1 and ni are completely equal to each other, but means that even if there is a slight difference between the refractive indices no1 and ni, the difference does not have a substantial effect on an optical path of the ordinary rays. A material used to form the first anisotropic layer 34 satisfying the above condition may be a polymer material with a positive photoelastic coefficient such as poly ethylene naphthalate (PEN), poly ethylene terephthalate (PET) or the like after it is elongated, or a liquid crystal polymer formed by photocuring a horizontally aligned nematic liquid crystal.

The second anisotropic layer 35 formed on the lower surface 31d of the isotropic light guide plate 31 may be formed of a material of which a refractive index no2 with respect to the ordinary rays is higher than the refractive index ne2 with respect to the extraordinary rays. The refractive index $ne2$ of the second anisotropic layer 35 with respect to the extraordinary rays may be substantially equal to the refractive index $ni$ of the isotropic micro-structures 33. Accordingly, the relationship between the refractive indices $no2$, $ne2$ and $ni$ may satisfy the following condition, i.e., $ni=ne2<no2$. Likewise, as described above, it is not necessary that the numerical values of refractive indices $ni$ and $ne2$ should be completely equal to each other, but the refractive indices $ni$ and $ne2$ may be considered to be equal when a slight difference between the refractive indices $ni$ and $ne2$ does not have a substantial effect on an optical path of the extraordinary rays. The material used to form the second anisotropic layer 35 may be a polymer material with a negative photoelastic coefficient such as syndiotactic polystyrene (s-PS) or the like after it is elongated, or a liquid crystal polymer formed by photocuring a vertically aligned discotic liquid crystal.

Hitherto, the relationship between the refractive index of each of the first and second anisotropic layers 34 and 35 and the isotropic microstructures 33 have been described. However, since the refractive index of the isotropic light guide plate 31 is also substantially equal to that of the isotropic micro-structures 33, the relationship between the refractive index of each of the first and second anisotropic layers 34 and 35 and the isotropic light guide plate 31 may be the same as the above-described relationship.

Thereinafter, an operation of the double-side illumination apparatus 30 having the above structure according to the current exemplary embodiment of the present invention will be more fully described.

First, the light emitted from the light source 32 enters the isotropic light guide plate 31 by being incident on the incident plane 31a. Then, the light propagates toward the opposite plane 31b of the isotropic light guide plate 31 in the isotropic light guide plate 31. Herein, the light is unpolarized light having both the ordinary rays (denoted as '⇆' in FIG. 3) and the extraordinary rays (denoted as ⊙ in FIG. 3).

Figure 4A:
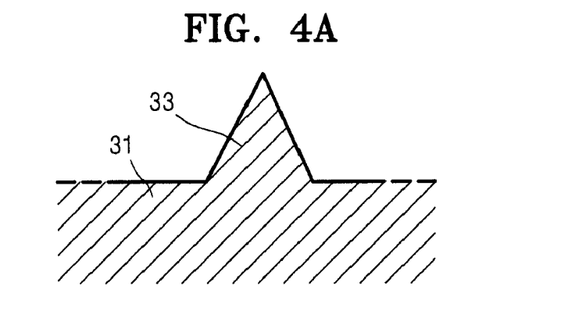
FIGS. 4A through 4D are schematic views illustrating various shapes of micro-structures used in the double-side illumination apparatus of FIG. 3, according to embodiments of the present invention.
Figure 4B:
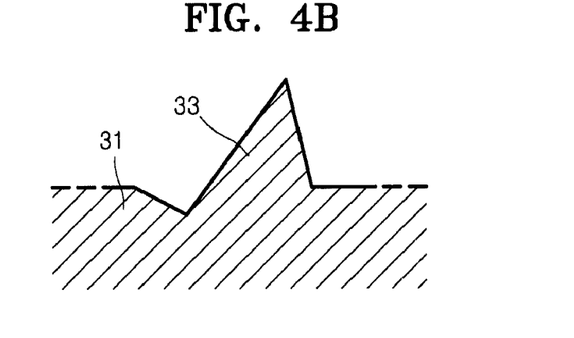
Figure 4C:
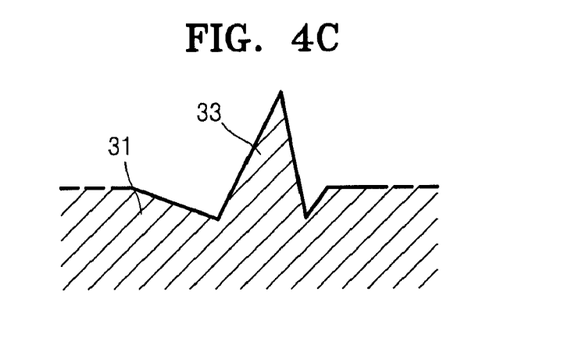
Figure 4D:
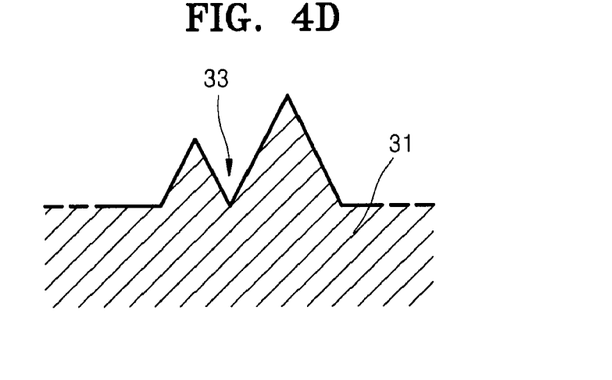

A portion of the light propagating inside the isotropic light guide plate 31 is incident on an interface between the upper surface 31c of the isotropic light guide plate 31 and the first anisotropic layer 34. As described above, the refractive index of the first anisotropic layer 34 with respect to the extraordinary rays is greater than the refractive index of the isotropic light guide plate 31, and the refractive index of the first anisotropic layer 34 with respect to the ordinary rays is substantially equal to the refractive index of the isotropic light guide plate 31. Accordingly, the light is not totally reflected by the interface between the isotropic light guide plate 31 and the first anisotropic layer 34 but is incident into the first anisotropic layer 34. Thereafter, the light is incident on the inclined surfaces of the isotropic micro-structures 33. Because the isotropic microstructures 33 have a lower refractive index than the first anisotropic layer 34 with respect to the extraordinary rays, the extraordinary rays are totally reflected by the inclined surfaces of the isotropic micro-structure 33, as illustrated in FIG. 3. As a result, the extraordinary rays are vertically out-coupled from the double-side illumination apparatus 30 through the upper surface of the double-side illumination apparatus 30. Herein, microprism elements included in the isotropic micro-structures 33 may have the shape of a simple triangular prism as illustrated in FIG. 4A. However, to increase vertically out-coupled light by reducing the amount of extraordinary rays, which are not totally reflected but transmitted at a large angle, the microprism elements may have the shape of a modified triangular prism as illustrated in FIGS. 4B through 4D.

On the contrary, because the first anisotropic layer 34 has the same refractive index as the isotropic micro-structures 33 with respect to the ordinary rays, the ordinary rays are transmitted through the isotropic micro-structures 33 without a change in optical path. Thus, the extraordinary rays and the ordinary rays are divided. Afterward, the ordinary rays are totally reflected by an interface between the upper surface of the first anisotropic layer 34 and an external air layer, and then propagate toward the isotropic light guide plate 31.

Meanwhile, another portion of light propagating inside the isotropic light guide plate 31 is incident on the interface between the lower surface 31d of the isotropic light guide plate 31 and the second anisotropic layer 35. Herein, the refractive index of the second anisotropic layer 35 with respect to the ordinary rays is higher than that of the isotropic light guide plate 31, and the refractive index of the second anisotropic layer 35 with respect to the extraordinary rays is substantially equal to that of the isotropic light guide plate 31. Therefore, the light passes through the interface between the isotropic light guide plate 31 and the second anisotropic layer 35, and is incident into the second anisotropic layer 35. Thereafter, the light is incident on the inclined surfaces of the isotropic microstructures 33. As described above, the second anisotropic layer 35 has a lower refractive index than the isotropic micro-structures 33 with respect to the ordinary rays. Accordingly, as illustrated in FIG. 3, the ordinary rays are totally reflected by the inclined surfaces of the isotropic microstructures 33 and then vertically out-coupled from the double-side illumination apparatus 30 through the lower surface of the double-side illumination apparatus 30. On the other hand, the second anisotropic layer 35 has the same refractive index as the isotropic micro-structures 33 with respect to the extraordinary rays. Thus, the extraordinary rays are transmitted through the isotropic microstructures 33 without a change in optical path. Afterward, the extraordinary rays are totally reflected by the interface between the surface of the second anisotropic layer 35 and the external air layer, and propagate toward the isotropic light guide plate 31.

In such a manner, the extraordinary rays are out-coupled only through the upper surface of the double-side illumination apparatus 30, and the ordinary rays are out-coupled only through the lower surface of the double-side illumination apparatus 30. The remaining light, which is not out-coupled, is reflected by the reflection plate 36 disposed on the opposite plane 31b of the isotropic light guide plate 31, and then is out-coupled through the upper or lower surface of the double-side illumination apparatus 30.

Here, the rear-side polarizer 37a of the first display device 37 disposed above the upper surface of the double side illumination apparatus 30 has a transmission axis which is parallel to a polarization direction of the extraordinary rays. Then, the extraordinary rays out-coupled through the upper surface of the double-side illumination apparatus 30 may not be absorbed by the rear-side polarizer 37a, and thus are provided to the liquid crystal layer 37b of the first display device 37. Likewise, the rear-side polarizer 38a of the second display device 38 has a transmission axis which is parallel to a polarization direction of the ordinary rays.

Figure 5:
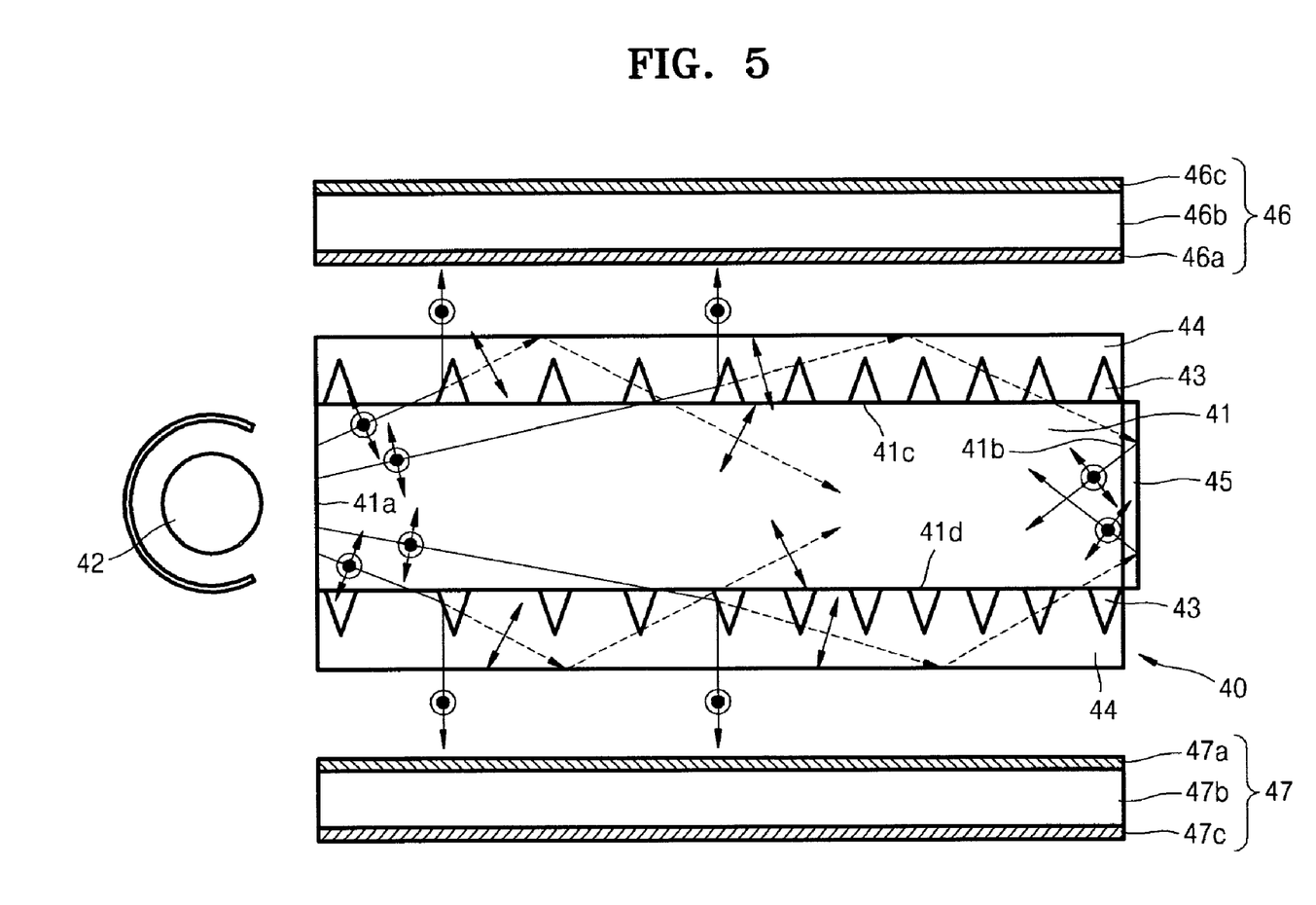
FIG. 5 is a sectional view illustrating structures of a double-side illumination apparatus and a dual display device employing the same according to another embodiment of the present invention.

FIG. 5 is a sectional view illustrating structures of a double-side illumination apparatus 40 and a dual display device employing the same according to another exemplary embodiment of the present invention. In the double-side illumination apparatus 40 of FIG. 5, anisotropic layers 44 disposed on upper and lower surfaces 41c and 41d of an isotropic light guide plate 41 are formed of the same material, which is different from the double-side illumination apparatus 30 of FIG. 3. In particular, the anisotropic layers 44 are formed of the same material as the first anisotropic layer 34 of FIG. 3. Accordingly, the isotropic layers 44 formed on the upper and lower surfaces 41c and 41d of the isotropic light guide plate 41 have a refractive index with respect to extraordinary rays higher than a refractive index with respect to ordinary rays. In addition, the refractive index of the anisotropic layers 44 with respect to the ordinary rays is substantially equal to those of the isotropic light guide plate 41 and isotropic micro-structures 43 formed on the upper and lower surfaces 41c and 41d of the isotropic light guide plate 41, respectively. In the double-side illumination apparatus 40 of FIG. 5, a diffusive reflector 45 is disposed on an opposite plane 41b of the isotropic light guide plate 41 instead of the simple reflection plate 36 of FIG. 3. Apart from the above elements, a light source 42 and the isotropic micro-structures 43 are identical to the light source 32 and the isotropic micro-structures 33 of FIG. 3, respectively.

According to the current exemplary embodiment of the present invention as illustrated in FIG. 5, among the light incident through an incident plane 41a of the isotropic light guide plate 41 from the light source 42, only the extraordinary rays are out-coupled through the upper and lower surfaces of the double-side illumination apparatus 40. The ordinary rays are totally reflected by an interface between the surface of the anisotropic layers 44 and the external air layer so that the ordinary rays propagate toward the opposite plane 41b of the isotropic light guide plate 41. Thereafter, the light is diffused and reflected by the diffusive reflector 45 disposed on the opposite plane 41b of the isotropic light guide plate 41. The diffusive reflector 45 plays a role in reflecting the incident light by diffusing the incident light in several directions. Since the polarization direction of the light is changed into a variety of directions during the diffusion and reflection, the ordinary rays become unpolarized. Then, the extraordinary rays of the diffused and reflected unpolarized light are again out-coupled through the upper and lower surfaces of the double-side illumination apparatus 40.

Referring to FIG. 5, the dual display device includes a first display device 46 disposed above the upper surface of the double-side illumination apparatus 40 and a second display device 47 disposed below the lower surface of the double-side illumination apparatus 40. In this case, rear-side polarizers 46a and 47a of the first and second display devices 46 and 47, respectively, have transmission axes which are all parallel to a polarization direction of the extraordinary rays. Thus, the extraordinary rays out-coupled through the upper and lower surfaces of the double-side illumination apparatus 40 may not be absorbed by the rear-side polarizers 46a and 47a, but provided to liquid crystal layers 46b and 47b of the first and second display devices 46 and 47, respectively. Meanwhile, reference numerals 46c and 47c denote front-side polarizers of the first and second display devices 46 and 47, respectively.

Figure 6:
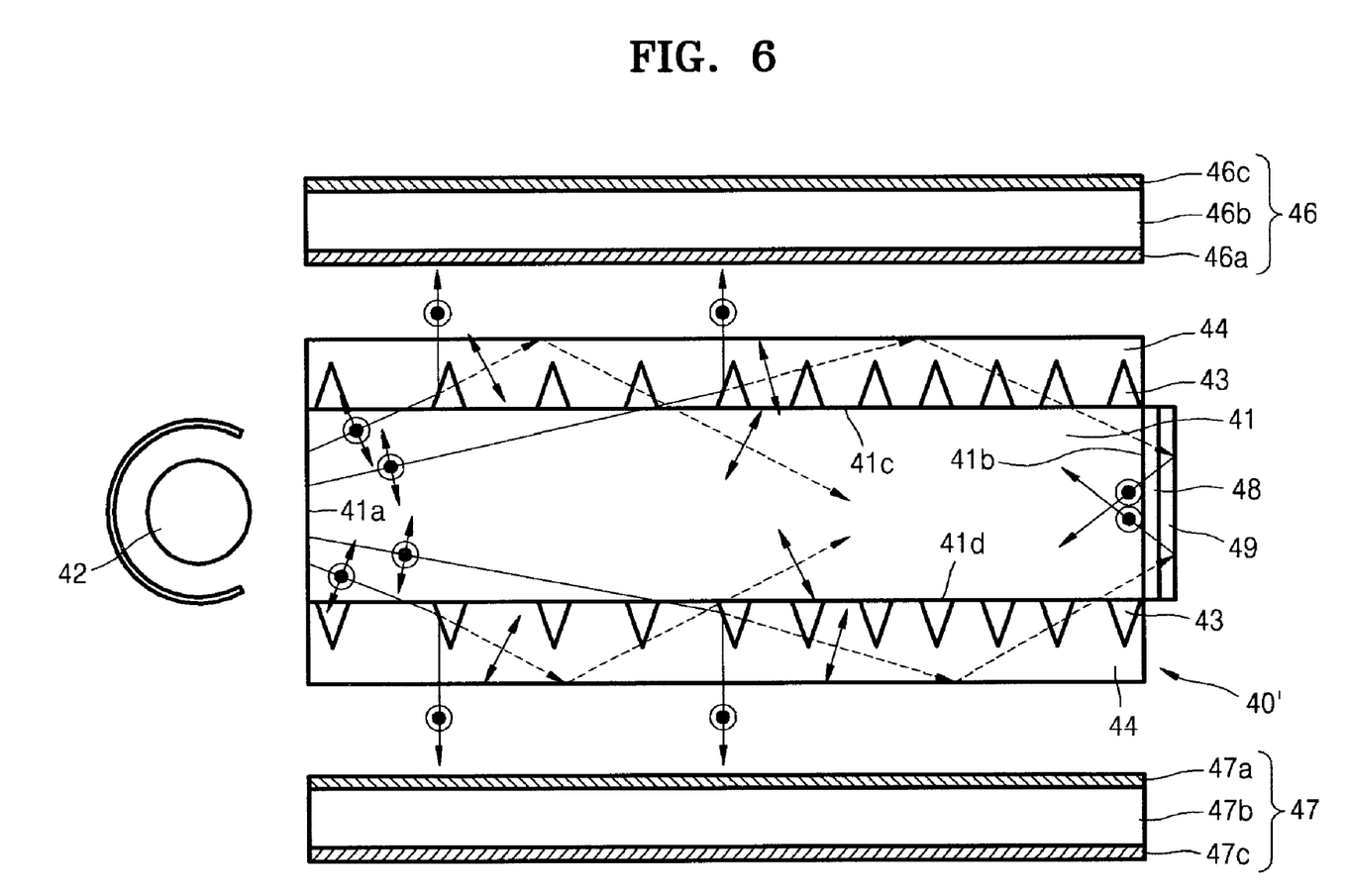
FIG. 6 is a sectional view illustrating structures of a double-side illumination apparatus and a dual display device employing the same according to another embodiment of the present invention.

FIG. 6 is a sectional view illustrating structures of a double-side illumination apparatus 40' and a dual display device employing the same according to another exemplary embodiment of the present invention. In the double-side illumination apparatus 40' of FIG. 6, a polarization-converting member 48 and a reflection plate 49 are disposed on an opposite plane 41b of an isotropic light guide plate 41 instead of the diffusive reflector 45 of FIG. 5, which is different from the double-side illumination apparatus 40 of FIG. 5. The other elements of the double-side illumination apparatus 40' of FIG. 6 have the same structures as those of the double-side illumination apparatus 40 of FIG. 5. The polarization-converting member 48 plays a role in changing the polarization direction of the ordinary rays re-incident on the isotropic light guide plate 41 after being reflected by the reflection plate 49. For example, the polarization-converting member 48 may be formed of an optically anisotropic material such as a ¼ wave plate. In the current embodiment of the present invention as illustrated in FIG. 6, the ordinary rays propagating toward the opposite plane 41b of the isotropic light guide plate 41 after they are totally reflected by the interface between the surface of the anisotropic layers 44 and the external air layer are changed into extraordinary rays by the polarization-converting member 48. Accordingly, most of the light re-incident on the isotropic light guide plate 41 consists of extraordinary rays and can be out-coupled through the upper and lower surfaces of the double-side illumination apparatus 40', respectively.

Figure 7:
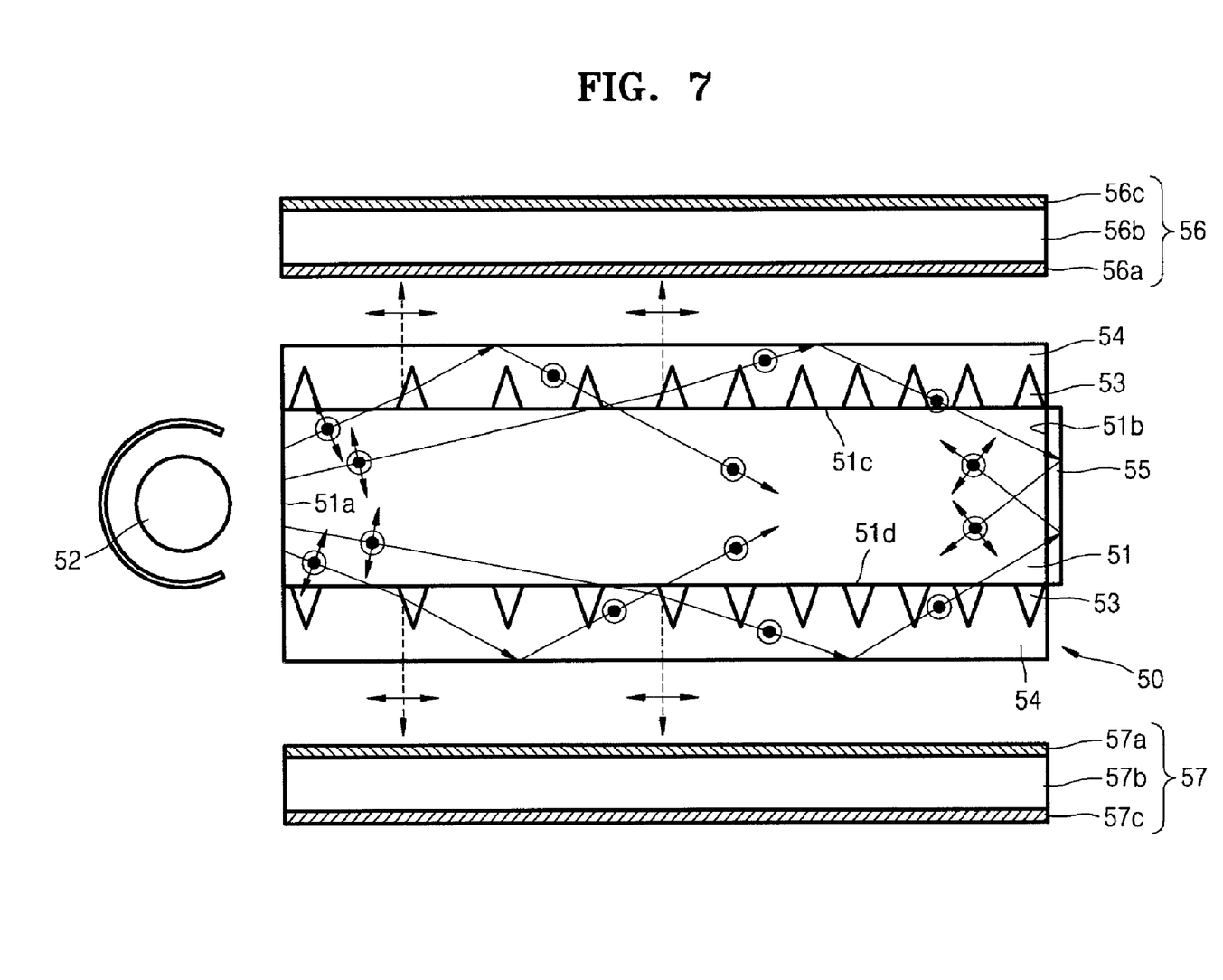
FIG. 7 is a sectional view illustrating structures of a double-side illumination apparatus and a dual display device employing the same according to another embodiment of the present invention.

FIG. 7 is a sectional view illustrating structures of a double-side illumination 50 apparatus and a dual display device employing the same according to another exemplary embodiment of the present invention. In the double-side illumination apparatus 50 of FIG. 7, anisotropic layers 54 disposed on upper and lower surfaces 51c and 51d of an isotropic light guide plate 51 are all formed of the same material as the second anisotropic layer 35 of FIG. 3, which is different from the double-side illumination apparatus 30 of FIG. 3. Therefore, a refractive index of the anisotropic layers 54 of FIG. 7 with respect to ordinary rays is higher than a refractive index with respect to extraordinary rays. In addition, the refractive index of the anisotropic layers 54 with respect to the extraordinary ray is substantially equal to those of the isotropic light guide plate 51 and isotropic micro-structures 53 formed on the upper and lower surfaces 51c and 51d of the isotropic light guide plate 51, respectively. Likewise, as described in the embodiment of FIG. 5, a diffusive reflector 55 is disposed on an opposite plane 51b of the isotropic light guide plate 51. However, a polarization-converting member and a reflection plate may be disposed instead of the diffusive reflector 55, as illustrated in the double-side illumination 40' of FIG. 6. Apart from the above elements, a light source 52 and the isotropic micro-structures 53 are identical to the light source 32 and the isotropic micro-structures 33 of FIG. 3, respectively.

According to the current embodiment of the present invention as illustrated in FIG. 7, among the light entering the isotropic light guide plate 51 by being incident on the incident plane 51a, only the ordinary rays are out-coupled through the upper and lower surfaces of the double-side illumination apparatus 50. On the contrary, the extraordinary rays are totally reflected by an interface between the surface of the anisotropic layers 54 and the external air layer, and propagate toward the opposite plane 51b of the isotropic light guide plate 51. Afterward, the extraordinary rays are diffused and reflected by the diffusive reflector 55 disposed on the opposite plane 51b of the isotropic light guide plate 51, thereby becoming unpolarized. Then, only the ordinary rays of the diffused and reflected unpolarized light may be out-coupled through the upper and lower surfaces of the double-side illumination apparatus 50.

Referring to FIG. 7, the dual display device includes a first display device 56 disposed above the upper surface of the double-side illumination apparatus 50 and a second display device 57 disposed below the lower surface of the double-side illumination apparatus 50. In this case, rear-side polarizers 56a and 57a of the first and second display devices 56 and 57, respectively, have transmission axes which are all parallel to a polarization direction of the ordinary rays. Thus, the ordinary rays out-coupled through the upper and lower surfaces of the double-side illumination apparatus 50 may not be absorbed by the rear-side polarizers 56a and 57a, but provided to liquid crystal layers 56b and 57b of the first and second display devices 56 and 57, respectively. Meanwhile, reference numerals 56c and 57c denote front-side polarizers of the first and second display devices 56 and 57, respectively.

The double-side illumination apparatus according to the present invention can provide light through both of upper and lower surfaces thereof, wherein all the light out-coupled through each of the upper and lower surfaces has a specific polarization component, respectively. Therefore, it is possible to prevent the light from being absorbed by an absorptive polarizer of a liquid crystal display device employing the double-side illumination apparatus so that the light can be used without loss. Accordingly, a dual display device can be provided which is capable of realizing excellent optical efficiency, high brightness, and thinness and slimness by supplying light thereto without loss using the double-side illumination apparatus according to the present invention. Furthermore, since additional optical films for enhancing brightness are not required, the fabrication cost of the dual display device according to the present invention can also be reduced significantly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A double-side illumination apparatus for a display device, comprising:
   a light source;
   an isotropic light guide plate having an incident plane on which light emitted from the light source is incident, an opposite plane facing the incident plane, and upper and lower surfaces through which the light is out-coupled;
   isotropic micro-structures formed on the upper and lower surfaces of the isotropic light guide plate, respectively; and
   first and second anisotropic layers respectively formed on the upper and lower surfaces of the isotropic light guide plate so as to completely cover the isotropic micro-structures, wherein the first and second anisotropic layers have different refractive indices with respect to a light having a first polarization component and a light having a second polarization component which are perpendicular to each other.

2. The double-side illumination apparatus of claim 1, wherein a refractive index of the first anisotropic layer with respect to the light having the first polarization component is higher than a refractive index of the isotropic micro-structures, and a refractive index of the first anisotropic layer with respect to the light having the second polarization component is substantially equal to the refractive index of the isotropic micro-structures, and
   a refractive index of the second anisotropic layer with respect to the light having the second polarization component is higher than the refractive index of the isotropic micro-structure, and a refractive index of the second anisotropic layer with respect to the light having the first polarization component being substantially equal to the refractive index of the isotropic micro-structure.

3. The double-side illumination apparatus of claim 2, further comprising a reflection plate disposed on the opposite plane of the isotropic light guide plate.

4. The double side illumination apparatus of claim 1, wherein refractive indices of the first and second anisotropic layers with respect to the light having the first polarization component are higher than the refractive index of the isotropic micro-structure, and refractive indices of the first and second anisotropic layers with respect to the light having the second polarization component are substantially equal to the refractive index of the isotropic micro-structure.

5. The double side illumination apparatus of claim 4, wherein the first and second anisotropic layers are formed of the same material.

6. The double side illumination apparatus of claim 4, further comprising a diffusive reflector disposed on the opposite plane of the isotropic light guide plate.

7. The double side illumination apparatus of claim 4, further comprising:
   a reflection plate disposed on the opposite plane of the isotropic light guide plate; and
   a polarization-converting member disposed between the opposite plane and the reflection plate.

8. The double side illumination apparatus of claim 7, wherein the polarization-converting member is a ¼ wave plate.

9. The double side illumination apparatus of claim 1, wherein the isotropic micro-structures are formed of the same isotropic material as the isotropic light guide plate.

10. The double-side illumination apparatus of claim 9, wherein the isotropic micro-structures are arrays of pluralities of microprisms disposed on the upper and lower surfaces of the isotropic light guide plate, respectively, wherein the space between neighboring microprisms becomes progressively smaller from the incident plane toward the opposite plane.

11. A dual display device comprising:
    a double-side illumination apparatus providing light through upper and lower surfaces thereof; and
    first and second display devices disposed opposite to upper and lower surfaces of the double-side illumination apparatus, respectively,
    wherein the double-side illumination apparatus comprises:
    a light source;
    an isotropic light guide plate comprising an incident plane on which light emitted from the light source is incident, an opposite plane facing the incident plane, and the upper and lower surfaces through which the light is out-coupled;
    isotropic micro-structures formed on the upper and lower surfaces of the isotropic light guide plate, respectively; and
    first and second anisotropic layers respectively formed on the upper and lower surfaces of the isotropic light guide plate so as to completely cover the isotropic micro-structures, wherein the first and second anisotropic layers have different refractive indices with respect to a light having a first polarization component and a light having a second polarization component which are perpendicular to each other.

12. The dual display device of claim 11, wherein a refractive index of the first anisotropic layer with respect to the light having the first polarization component is higher than a refractive index of the isotropic micro-structures, and a refractive index of the first anisotropic layer with respect to the light having the second polarization component is substantially equal to the refractive index of the isotropic micro-structures, and
    a refractive index of the second anisotropic layer with respect to the light having the second polarization component is higher than the refractive index of the isotropic micro-structures, and a refractive index of the second anisotropic layer with respect to the light having the first polarization component is substantially equal to the refractive index of the isotropic micro-structures.

13. The dual display device of claim 12, further comprising a reflection plate disposed on the opposite plane of the isotropic light guide plate.

14. The dual display device of claim 11, wherein refractive indices of the first and second anisotropic layers with respect to the light having the first polarization component are higher than the refractive index of the isotropic micro-structures, and refractive indices of the first and second anisotropic layers with respect to the light having the second polarization component are substantially equal to the refractive index of the isotropic micro-structures.

15. The dual display device of claim 14, wherein the first and second anisotropic layers are formed of the same material.

16. The dual display device of claim 14, further comprising a diffusive reflector disposed on the opposite plane of the isotropic light guide plate.

17. The dual display device of claim 14, further comprising:
a reflection plate disposed on the opposite plane of the isotropic light guide plate; and
a polarization-converting member disposed between the opposite plane and the reflection plate.

18. The dual display device of claim 17, wherein the polarization-converting member is a ¼ wave plate.

19. The dual display device of claim 11, wherein the isotropic micro-structure is formed of the same isotropic material as the isotropic light guide plate.

20. The dual display device of claim 19, wherein the isotropic micro-structures are arrays of pluralities of microprisms disposed on the upper and lower surfaces of the isotropic light guide plate, respectively, wherein the space between neighboring microprisms becomes progressively smaller from the incident plane toward the opposite plane.

* * * * *